United States Patent
Noguchi et al.

(10) Patent No.: US 10,263,286 B2
(45) Date of Patent: Apr. 16, 2019

(54) SECONDARY BATTERY ELECTROLYTE AND SECONDARY BATTERY

(71) Applicant: NEC Corporation, Tokyo (JP)

(72) Inventors: Takehiro Noguchi, Tokyo (JP); Yuukou Katou, Tokyo (JP); Hideaki Sasaki, Tokyo (JP); Makiko Takahashi, Tokyo (JP); Emiko Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 561 days.

(21) Appl. No.: 14/889,718

(22) PCT Filed: May 9, 2014

(86) PCT No.: PCT/JP2014/062520
§ 371 (c)(1),
(2) Date: Nov. 6, 2015

(87) PCT Pub. No.: WO2014/181877
PCT Pub. Date: Nov. 13, 2014

(65) Prior Publication Data
US 2016/0099486 A1    Apr. 7, 2016

(30) Foreign Application Priority Data

May 10, 2013 (JP) ................................ 2013-100414

(51) Int. Cl.
| | |
|---|---|
| *H01M 10/0569* | (2010.01) |
| *H01M 4/505* | (2010.01) |
| *H01M 4/525* | (2010.01) |
| *H01M 10/052* | (2010.01) |
| *H01M 10/058* | (2010.01) |
| *H01M 4/58* | (2010.01) |
| *H01M 10/0567* | (2010.01) |
| *H01M 4/485* | (2010.01) |
| *H01M 10/04* | (2006.01) |

(52) U.S. Cl.
CPC ....... *H01M 10/0569* (2013.01); *H01M 4/485* (2013.01); *H01M 4/505* (2013.01); *H01M 4/525* (2013.01); *H01M 4/5825* (2013.01); *H01M 10/049* (2013.01); *H01M 10/052* (2013.01); *H01M 10/058* (2013.01); *H01M 10/0567* (2013.01); *H01M 2300/0034* (2013.01)

(58) Field of Classification Search
CPC ......... H01M 10/0569; H01M 10/0567; H01M 10/052; H01M 10/058; H01M 10/049; H01M 4/505; H01M 4/525; H01M 4/5825; H01M 4/485; H01M 2300/0034
See application file for complete search history.

(56) References Cited

U.S. PATENT DOCUMENTS

| | | | |
|---|---|---|---|
| 2004/0038133 A1 | 2/2004 | Yamaguchi et al. | |
| 2010/0124708 A1 | 5/2010 | Matsui et al. | |
| 2013/0266847 A1 | 10/2013 | Noguchi et al. | |

FOREIGN PATENT DOCUMENTS

| | | |
|---|---|---|
| JP | 2004-87136 | 3/2004 |
| JP | 2009-211822 | 9/2009 |
| JP | 2010-123287 | 6/2010 |
| JP | 2012-74135 | 4/2012 |
| JP | 2013-161706 | 8/2013 |
| JP | 2013-218963 | * 10/2013 |
| WO | WO 2008/007734 | 1/2008 |
| WO | WO 2011/162169 A1 | 12/2011 |
| WO | WO 2012/077712 A1 | 6/2012 |

OTHER PUBLICATIONS

International Search Report dated Jul. 15, 2014 in corresponding PCT International application.
Notice of Reasons for Rejection dated May 22, 2018, issued by the Japanese Patent Office (JPO) in Partial counterpart Japanese Patent Application No. 2015-515913.

* cited by examiner

Primary Examiner — Laura Weiner
(74) Attorney, Agent, or Firm — Finnegan, Henderson, Farabow, Garrett & Dunner, L.L.P.

(57) ABSTRACT

The present invention relates to a secondary battery electrolyte, which contains a first fluorine-containing ether compound, a second fluorine-containing ether compound, and at least one selected from fluorine-containing phosphate ester compounds and sulfone compounds, wherein the fluorine substitution rate of the first fluorine-containing ether compound is lower than that of the second fluorine-containing ether compound, and the content of the first fluorine-containing ether compound is higher than that of the second fluorine-containing ether compound. According to the present invention, with respect to batteries operating at a high voltage, and batteries supposed to be used at a high temperature for a long period, there can be provided a lithium secondary battery suppressed in the decomposition reaction of the electrolyte and improved in the life characteristics.

16 Claims, 1 Drawing Sheet

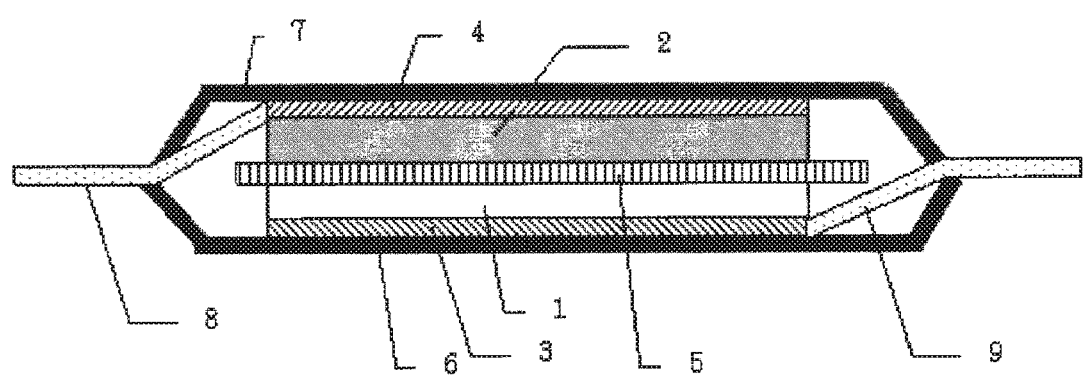

SECONDARY BATTERY ELECTROLYTE AND SECONDARY BATTERY

CROSS-REFERENCE TO RELATED PATENT APPLICATIONS

This application is a National Stage Entry of International Application No. PCT/JP2014/062520, filed May 9, 2014, which claims priority from Japanese Patent Application No. 2013-100414, filed May 10, 2013. The entire contents of the above-referenced applications are expressly incorporated herein by reference.

TECHNICAL FIELD

The present invention relates to a secondary battery electrolyte and a secondary battery using the same, and further to a method for manufacturing these.

BACKGROUND ART

Lithium secondary batteries are broadly used for portable electronic devices, personal computers and the like. Whereas the size reduction and weight reduction are demanded, raising the energy density is an important problem.

Conceivable methods of raising the energy density of lithium secondary batteries include some methods, and among these, raising the operating voltage of the batteries is effective. In lithium secondary batteries using lithium cobaltate or lithium manganate as their positive electrode active material, the average operating voltage is 3.6 to 3.8 V (4-V class) with respect to a metallic lithium reference. This is because the operating voltage is determined by the redox reaction ($Co^{3+} \leftrightarrow Co^{4+}$ or $Mn^{3+} \leftrightarrow Mn^{4+}$) of cobalt ions or manganese ions.

On the other hand, since a spinel compound in which in lithium manganate, part of manganese is substituted with nickel or the like, for example, $LiNi0.5Mn1.5O_4$, exhibits a potential plateau in the region of 4.5 V or higher, the use of such a spinel compound as a positive electrode active material enables the operating voltage of 5-V class to be realized. In a positive electrode using such a spinel compound, manganese is present in the 4-valence state, and the operating voltage of the battery is determined by the redox of $Ni^{2+} \leftrightarrow Ni^{4+}$ instead of the redox of $Mn^{3+} \leftrightarrow Mn^{4+}$.

The capacity of $LiNi_{0.5}Mn_{1.5}O_4$ is 130 mAh/g or higher; the average operating voltage is 4.6 V or higher with respect to metallic lithium; and although the lithium absorbing capacity is lower than that of $LiCoO_2$, the energy density is higher than that of $LiCoO_2$. For these reasons, $LiNi_{0.5}Mn_{1.5}O_4$ is promising as a positive electrode material.

In batteries using a high-potential positive electrode active material such as $LiNi_{0.5}Mn_{1.5}O_4$, however, the operating voltage becomes higher than in batteries using $LiCoO_2$, $LiMn_2O_4$ or the like as a positive electrode active material, and the decomposition reaction of an electrolyte at the contact portion of a positive electrode with the electrolyte is liable to progress. The decomposition reaction generates gas. Since the generation of the gas raises the internal pressure of cells and causes swelling of laminate cells, it is a problem on practical uses. Hence, there has been demanded an electrolyte with high voltage resistance, enabling the generation of such gases to be suppressed. Further the similar phenomenon becomes a problem also in conventionally used 4-V class batteries, for example in a storing condition under a high temperature environment for a long period. As electrolytes with high voltage resistance capable of suppressing the gas generation, fluorinated solvents and the like are thought of. Examples of the potential solvents include fluorinated carbonates, fluorinated carbonate esters, fluorine-containing ether compounds and fluorine-containing phosphate ester compounds, all of which are fluorinated solvents. Among these, fluorine-containing ether compounds are useful because of being high in the life improvement effect and being comparatively low in the viscosity.

For example, Patent Literature 1 states that in a lithium secondary battery containing a positive electrode active material operating at potentials of 4.5 V or higher, its nonaqueous electrolytic solvent contains a fluorine-containing phosphate ester compound. Further Patent Literature 2 describes a lithium ion secondary battery in which its nonaqueous electrolyte contains a fluorinated ether.

CITATION LIST

Patent Literature

Patent Literature 1: International Publication No. WO2012/077712
Patent Literature 2: International Publication No. WO2011/162169

SUMMARY OF INVENTION

Technical Problem

As described above, for batteries using a positive electrode material having a high discharge potential, such as $LiNi_{0.5}Mn_{1.5}O_4$, as an active material, and also for batteries using a positive electrode material operating at 4-V class, such as $LiMn_2O_4$, $LiCoO_2$, $LiNiO_2$ or $LiNi_{1/3}Co_{1/3}Mn_{1/3}O_2$, as an active material, a long-term cycle life under a high-temperature condition of 45° C. or higher is demanded.

Although carbonate-based materials are conventionally mainly used as nonaqueous electrolytes, there is room for improvement in the capacity reduction and the gas generation caused by the decomposition of the electrolytes in cells in the high-voltage operation and the high-temperature long-term operation, as described above.

Although with respect to electrolytes having a high voltage resistance capable of suppressing the gas generation, Patent Literature 1 and Patent Literature 2 describe high-voltage batteries using an electrolyte containing a fluorine-containing ether compound or a fluorine-containing phosphate ester compound, a further improvement needs to be made.

The fluorine-containing ether compound, depending on its kind, has a problem such that its oxidation resistance is low. When the fluorine content is increased in order to raise the oxidation resistance, there arises a problem in some cases such that battery characteristics decrease due to an increase in the viscosity, a decrease in the reduction resistance, a decrease in the compatibility, and the like.

Then, an object of the present invention is to provide a secondary battery electrolyte and a secondary battery improved in the life characteristics, particularly in the life characteristics at a high voltage.

Solution to Problem

One aspect of the present invention relates to a secondary battery electrolyte, which comprises:

a first fluorine-containing ether compound represented by the formula (1);
a second fluorine-containing ether compound represented by the formula (1); and
at least one selected from fluorine-containing phosphate ester compounds represented by the formula (2) and sulfone compounds represented by the formula (3),
wherein the fluorine substitution rate of the first fluorine-containing ether compound is lower than the fluorine substitution rate of the second fluorine-containing ether compound;
the content of the first fluorine-containing ether compound is higher than the content of the second fluorine-containing ether compound;
the content of the first fluorine-containing ether compound is 0.1 vol % or higher and 80 vol % or lower of the electrolyte;
the content of the second fluorine-containing ether compound is 0.1 vol % or higher and 40 vol % or lower of the electrolyte; and
the total of the contents of the fluorine-containing phosphate ester compound and the sulfone compound is 0.1 vol % or higher and 70 vol % or lower of the electrolyte.

  (1)

wherein $R_1$ and $R_2$ are each independently alkyl group or fluorine-containing alkyl group; and at least one of $R_1$ and $R_2$ is fluorine-containing alkyl group.

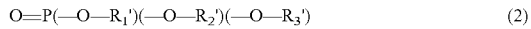  (2)

wherein $R_1'$, $R_2'$ and $R_3'$ are each independently alkyl group or fluorine-containing alkyl group; and at least one of $R_1'$, $R_2'$ and $R_3'$ is fluorine-containing alkyl group.

  (3)

wherein $R_1''$ and $R_2''$ are each independently substituted or unsubstituted alkyl group; and this compound may be a cyclic compound in which carbon atoms of $R_1''$ and $R_2''$ are bonded through a single bond or a double bond.

Advantageous Effects of Invention

According to the embodiment of the present invention, a secondary battery improved in the life characteristics can be provided.

BRIEF DESCRIPTION OF DRAWING

FIG. 1 is a view illustrating a cross-sectional structure of a secondary battery according to the present embodiment.

DESCRIPTION OF EMBODIMENTS

As a result of studies on a secondary battery electrolyte as described above, the present inventors have found that an effect of improving the life characteristics is attained by incorporating two or more fluorine-containing ether compounds and one or more selected from fluorine-containing phosphate ester compounds and sulfone compounds in the electrolyte.

An electrolyte according to the present embodiment has a feature of containing two or more fluorine-containing ether compounds. The electrolyte according to the present embodiment further has a feature of containing one or more selected from fluorine-containing phosphate ester compounds and sulfone compounds. Further a secondary battery according to the present embodiment has a feature of having an electrolyte containing two or more fluorine-containing ether compounds and one or more selected from fluorine-containing phosphate ester compounds and sulfone compounds.

The use of such an electrolyte enables the life characteristics of a secondary battery to be improved. Particularly in the case of using a positive electrode material capable of operating at high potentials of 4.5 V or higher and so on with respect to lithium as an active material, the effect is large.

The preferred embodiment of the present invention will be described.

(Electrolyte)

An electrolyte (nonaqueous electrolyte) contains a supporting salt and a nonaqueous electrolytic solvent; and the nonaqueous electrolyte contains two or more fluorine-containing chain ether compounds (hereinafter, referred to simply as "fluorine-containing ether compounds" in some cases) represented by the following general formula (1). The incorporation of two or more fluorine-containing ether compounds enables the life characteristics to be improved.

  (1)

wherein $R_1$ and $R_2$ are each independently alkyl group or fluorine-containing alkyl group; and at least one of $R_1$ and $R_2$ is fluorine-containing alkyl group.

The numbers of carbon atoms of the alkyl groups ($R_1$ and $R_2$) in the fluorine-containing ether compound represented by the general formula (1) are each independently preferably 1 or more and 10 or less, and more preferably 1 or more and 8 or less. This is because when the number of carbon atoms of the alkyl groups is 10 or less, the increase in the viscosity of the electrolyte is suppressed and it becomes easy for the electrolyte to permeate pores in electrodes and a separator; and the ionic conductivity is improved, and there becomes good the current value in charge and discharge characteristics of a battery. The alkyl groups ($R_1$ and $R_2$) include straight-chain and branched-chain ones.

The number of carbon atoms of the fluorine-containing ether compound represented by the general formula (1), that is, the sum total of the numbers of carbon atoms of the alkyl groups $R_1$ and $R_2$ is, from the viewpoint of the boiling point and the viscosity, preferably about 4 or more and 10 or less, and more preferably 5 or more and 9 or less.

In the present embodiment, among hydrogen of the alkyl group represented by $R_1$ or $R_2$ in the formula (1), part or the whole thereof is replaced with fluorine. This is because the incorporation of fluorine enables the oxidation resistance to be raised and the improvement of the cycle characteristics is enabled. This is because when the content of fluorine atoms is high, the voltage resistance is more improved; and also in a high-voltage battery or a battery having been operated at a high temperature for a long period, the decrease in the capacity can be suppressed. By contrast, when the content of fluorine atoms is too high, the reduction resistance decreases and the compatibility with other solvents of the electrolyte decreases in some cases.

In the present embodiment, the nonaqueous electrolyte contains at least two fluorine-containing ether compounds represented by the general formula (1), that is, a first fluorine-containing ether compound and a second fluorine-containing ether compound; and it is preferable that the fluorine substitution rate of the first fluorine-containing ether compound is lower than the fluorine substitution rate of the second fluorine-containing ether compound; and the content of the first fluorine-containing ether compound in the nonaqueous electrolyte is higher than the content of the second fluorine-containing ether compound. Here, in the present description, the term "fluorine substitution rate" indicates a ratio of the number of fluorine atoms of a fluorine-containing compound (fluorinated compound) to the sum total of the number of hydrogen atoms and the number of the fluorine atoms thereof.

The fluorine substitution rate of the first fluorine-containing ether compound is usually 20% or higher and 80% or lower, preferably in the range of 40% or higher and 80% or lower, and more preferably in the range of 50% or higher and 75% or lower. This is because the fluorine substitution rate in such a range allows the compatibility with other solvents in the electrolyte to be held high and also the oxidation resistance to be secured. The volume ratio of the first fluorine-containing ether compound in the electrolyte is usually 0.01% or higher and 80% or lower, preferably 0.1% or higher and 80% or lower, and more preferably 5% or higher and 75% or lower.

It is preferable that the second fluorine-containing ether compound has a higher fluorine substitution rate than the first fluorine-containing ether compound. This is because this allows the oxidation resistance to be raised. Specifically, the fluorine substitution rate of the second fluorine-containing ether compound is usually 70% or higher and 100% or lower, preferably in the range of 70% or higher and 95% or lower, and more preferably in the range of higher than 75% and 95% or lower. The substitution rate of the second fluorine-containing ether compound in such a range allows the oxidation resistance to be held higher than in the case where the first fluorine-containing ether compound is used singly, or two or more first fluorine-containing ether compounds only are used. Further by holding the volume ratio of the second fluorine-containing ether compound in the electrolyte lower than that of the first fluorine-containing ether compound, the compatibility in the electrolyte can be held. Specifically, the volume ratio of the second fluorine-containing ether compound in the electrolyte is made to be usually 0.01% or higher and 40% or lower, preferably 0.1% or higher and 40% or lower, and more preferably 5% or higher and 35% or lower.

The total of contents of two or more fluorine-containing ether compounds represented by the general formula (1) contained in the nonaqueous electrolyte is not especially limited, but is preferably 0.01 to 90 vol % in the nonaqueous electrolyte. When the total content is 90 vol % or lower, the ionic conductivity of the electrolyte is improved, and the charge and discharge rate of a battery becomes better. The total of contents of the fluorine-containing ether compounds represented by the general formula (1) is more preferably 0.05 to 85 vol %, and still more preferably 0.1 to 80 vol %. When the total content is 0.1 vol % or higher, the effect of enhancing the voltage resistance is improved.

Examples of the fluorine-containing ether compounds include 2,2,3,3,3-pentafluoropropyl 1,1,2,2-tetrafluoroethyl ether, 1,1,2,2-tetrafluoroethyl 2,2,2-trifluoroethyl ether, 1H,1H,2'H,3H-decafluorodipropyl ether, 1,1,1,2,3,3-hexafluoropropyl-2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H,1H,5H-perfluoropentyl-1,1,2,2-tetrafluoroethyl ether, 1H-perfluorobutyl-1H-perfluoroethyl ether, methyl perfluoropentyl ether, methyl perfluorohexyl ether, methyl 1,1,3,3,3-pentafluoro-2-(trifluoromethyl)propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H,1H,5H-octafluoropentyl 1,1,2,2-tetrafluoroethyl ether, 1H,1H,2'H-perfluorodipropyl ether, heptafluoropropyl 1,2,2,2-tetrafluoroethyl ether, 1,1,2,2-tetrafluoroethyl-2,2,3, 3-tetrafluoropropyl ether, 2,2,3,3,3-pentafluoropropyl-1,1,2,2-tetrafluoroethyl ether, ethyl nonafluorobutyl ether, methyl nonafluorobutyl ether, 1,1-difluoroethyl-2,2,3,3-tetrafluoropropyl ether, bis(2,2,3,3-tetrafluoropropyl)ether, 1,1-difluoroethyl-2,2,3,3,3-pentafluoropropyl ether, 1,1-difluoroethyl-1H,1H-heptafluorobutyl ether, 2,2,3,4,4,4-hexafluorobutyl-difluoromethyl ether, bis(2,2,3,3,3-pentafluoropropyl)ether, nonafluorobutyl methyl ether, bis(1H,1H-heptafluorobutyl) ether, 1,1,2,3,3,3-hexafluoropropyl-1H,1H-heptafluorobutyl ether, 1H,1H-heptafluorobutyl-trifluoromethyl ether, 2,2-difluoroethyl-1,1,2,2-tetrafluoroethyl ether, bis(trifluoroethyl) ether, bis(2,2-difluoroethyl)ether, bis(1,1,2-trifluoroethyl) ether and 1,1,2-trifluoroethyl-2,2,2-trifluoroethyl ether.

Among these, from the viewpoint of the voltage resistance, the boiling point and the like, preferable are 1,1,2,2-tetrafluoroethyl-2,2,3,3-tetrafluoropropyl ether, 2,2,3,4,4,4-hexafluorobutyl-difluoromethyl ether, 1,1-difluoroethyl-2,2,3,3-tetrafluoropropyl ether, 1,1,1,2,3,3-hexafluoropropyl-2,2-difluoroethyl ether, 1,1-difluoroethyl-1H,1H-heptafluorobutyl ether, 1H,1H,2'H,3H-decafluorodipropyl ether, bis(2,2,3,3,3-pentafluoropropyl)ether, 1H,1H,5H-perfluoropentyl-1,1,2,2-tetrafluoroethyl ether, bis(1H,1H-heptafluorobutyl)ether, 1H,1H,2'H-perfluorodipropyl ether, 1,1,2,3,3,3-hexafluoropropyl-1H,1H-heptafluorobutyl ether, 1H-perfluorobutyl-1H-perfluoroethyl ether and the like.

In the present embodiment, the nonaqueous electrolyte may contain three or more fluorine-containing ether compounds represented by the formula (1).

In the case where the nonaqueous electrolyte contains three or more fluorine-containing ether compounds, a fluorine-containing ether compound having a highest fluorine substitution rate is taken to be a second fluorine-containing ether compound, and the other fluorine-containing ether compounds are taken to be a first fluorine-containing ether compound; and it is preferable that the total of the content of the first fluorine-containing ether compound is larger than the content of the second fluorine-containing ether compound.

In the case where the nonaqueous electrolyte contains one or more fluorine-containing ether compounds having a fluorine substitution rate of higher than 80%, however, the fluorine-containing ether compounds having a fluorine substitution rate of higher than 80% are taken to be a second fluorine-containing ether compound, and the other fluorine-containing ether compounds are taken to be a first fluorine-containing ether compound; and it is preferable that the total of the content of the first fluorine-containing ether compound is higher than the total of the content of the second fluorine-containing ether compound.

The fluorine-containing ether compounds have a problem of the compatibility with other solvents being low, but by adding a fluorine-containing phosphate ester compound or a sulfone compound, the compatibility between the solvents is raised. Even if a low-compatibility solvent is once homogeneously mixed, when the solvent is left for a long period or when the temperature rises or falls, the solvent separates in some cases. However, by mixing with a fluorine-containing phosphate ester compound or a sulfone compound, the long-term stability of the electrolyte can be improved.

Since a fluorine-containing ether compound having a high fluorine substitution rate is low in the compatibility with other solvents among the fluorine-containing ether compounds, the effect of improving the homogeneity by mixing with a fluorine-containing phosphate ester compound or a sulfone compound is large.

In the present embodiment, the nonaqueous electrolyte contains at least one selected from fluorine-containing phosphate esters represented by the formula (2) and sulfone compounds represented by the formula (3).

The nonaqueous electrolyte can contain a fluorine-containing phosphate ester represented by the formula (2).

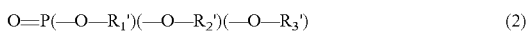

$$O=P(-O-R_1')(-O-R_2')(-O-R_3') \qquad (2)$$

wherein $R_1'$, $R_2'$ and $R_3'$ each independently denote alkyl group or fluorine-containing alkyl group; and at least one of $R_1'$, $R_2'$ and $R_3'$ is fluorine-containing alkyl group.

In the formula (2), the numbers of carbon atoms of $R_1'$, $R_2'$ and $R_3'$ are preferably each independently 1 to 3.

Examples of the fluorine-containing phosphate ester compounds include 2,2,2-trifluoroethyl dimethyl phosphate, bis(trifluoroethyl)methyl phosphate, bistrifluoroethyl ethyl phosphate, tris(trifluoromethyl)phosphate, pentafluoropropyl dimethyl phosphate, heptafluorobutyl dimethyl phosphate, trifluoroethyl methyl ethyl phosphate, pentafluoropropyl methyl ethyl phosphate, heptafluorobutyl methyl ethyl phosphate, trifluoroethyl methyl propyl phosphate, pentafluoropropyl methyl propyl phosphate, heptafluorobutyl methyl propyl phosphate, trifluoroethyl methyl butyl phosphate, pentafluoropropyl methyl butyl phosphate, heptafluorobutyl methyl butyl phosphate, trifluoroethyl diethyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, heptafluorobutyl dibutyl phosphate, tris(2,2,3,3-tetrafluoropropyl)phosphate, tris(2,2,3,3,3-pentafluoropropyl)phosphate, tris(2,2,2-trifluoroethyl)phosphate, tris(1H,1H-heptafluorobutyl)phosphate and tris(1H,1H,5H-octafluoropentyl)phosphate.

Among these, tris(2,2,2-trifluoroethyl)phosphate represented by the following formula (2-1) is preferable because of being high in the effect of suppressing the decomposition of the electrolyte at high potentials.

The fluorine-containing phosphate ester compound can be used singly or concurrently in two or more.

The content of the fluorine-containing phosphate ester compound is, from the viewpoint of the voltage resistance and the ionic conductivity, preferably 0.1 to 70 vol % of the nonaqueous electrolyte, more preferably 1 to 60 vol %, and still more preferably 2 to 50 vol %.

In the present embodiment, the nonaqueous electrolyte can contain a sulfone compound represented by the following formula (3).

$$R_1''-SO_2-R_2'' \qquad (3)$$

wherein $R_1''$ and $R_2''$ each independently denote substituted or unsubstituted alkyl group; and this compound may be a cyclic compound in which carbon atoms of $R_1''$ and $R_2''$ are bonded through a single bond or a double bond.

In the formula (3), the number of carbon atoms $n_1$ of $R_1''$ and the number of carbon atoms $n_2$ of $R_2''$ are, respectively, preferably $1 \leq n_1 \leq 12$ and $1 \leq n_2 \leq 12$, more preferably $1 \leq n_1 \leq 6$ and $1 \leq n_2 \leq 6$, and still more preferably $1 \leq n_1 \leq 3$ and $1 \leq n_2 \leq 3$. The alkyl groups include straight-chain, branched-chain or cyclic ones.

$R_1''$ and $R_2''$ may each have a substituent. Examples of the substituent include alkyl groups (for example, methyl group, ethyl group, propyl group, isopropyl group, butyl group, isobutyl group) having 1 to 6 carbon atoms, aryl groups (for example, phenyl group, naphthyl group) having 6 to 10 carbon atoms, and halogen atoms (for example, a chlorine atom, a bromine atom, a fluorine atom).

The sulfone compound represented by the formula (3) may be a cyclic compound represented by the following formula (4).

wherein $R_3$ denotes substituted or unsubstituted alkylene group.

In the formula (4), the number of carbon atoms of $R_3$ is preferably 4 to 9, and more preferably 4 to 6.

$R_3$ may have a substituent. Examples of the substituent include alkyl groups (for example, methyl group, ethyl group, propyl group, isopropyl group, butyl group) having 1 to 6 carbon atoms, and halogen atoms (for example, a chlorine atom, a bromine atom, a fluorine atom).

Examples of the sulfone compounds include sulfolane (tetramethylene sulfone), 3-methylsulfolane, dimethyl sulfone (for example, 3,4-dimethylsulfone, 2,5-dimethylsulfone), ethyl methyl sulfone, diethyl sulfone, butyl methyl sulfone, dibutyl sulfone, methyl isopropyl sulfone, diisopropyl sulfone, methyl tert-butyl sulfone, butyl ethyl sulfone, butyl propyl sulfone, butyl isopropyl sulfone, di-tert-butyl sulfone, diisobutyl sulfone, ethyl isopropyl sulfone, ethyl isobutyl sulfone, tert-butyl ethyl sulfone, propyl ethyl sulfone, isobutyl isopropyl sulfone, butyl isobutyl sulfone, isopropyl(1-methylpropyl)sulfone, pentamethylene sulfone, hexamethylene sulfone, ethylene sulfone and trimethylene sulfone. These compounds can be used singly or concurrently in two or more.

The content of the sulfone compound is, from the viewpoint of the compatibility and the viscosity of the electrolyte, preferably 0.1 to 70 vol % of the nonaqueous electrolyte, more preferably 1 to 65 vol %, and still more preferably 3 to 60 vol %.

Further in the present embodiment, the total of contents of the fluorine-containing phosphate ester compound and the sulfone compound is preferably 0.1 to 70 vol % of the electrolyte, more preferably 1 to 65 vol %, and still more preferably 5 to 60 vol %.

The nonaqueous electrolyte is allowed to further contain a cyclic carbonate (including a fluorinated one), a chain carbonate (including a fluorinated one), a chain carboxylate ester (including a fluorinated one), a cyclic carboxylate ester (including a fluorinated one), a cyclic ether (including a fluorinated one), a phosphate ester and the like.

Since a cyclic carbonate has a high relative permittivity, the addition thereof improves the dissociation of a supporting salt and makes it easy for a sufficient conductivity to be imparted. Since further addition of a chain carbonate, a fluorine-containing ether compound, a fluorinated carboxylate ester, a fluorinated carbonate and the like reduces the viscosity of the electrolyte, the addition has an advantage of improving the ionic mobility in the electrolyte. Further a cyclic carbonate (including a fluorinated one), a chain carbonate (including a fluorinated one), a fluorinated carboxylate ester and a fluorinated carbonate are suitable for being mixed with a fluorine-containing ether compound of the general formula (1), because of high voltage resistance and high conductivity.

The cyclic carbonate is not especially limited, but examples thereof include ethylene carbonate (EC), propylene carbonate (PC), butylene carbonate (BC) and vinylene carbonate (VC). Further the cyclic carbonate includes fluorinated cyclic carbonates. Examples of the fluorinated cyclic carbonates include compounds in which part or the whole of hydrogen atoms of ethylene carbonate (EC), propylene carbonate (PC), butylene carbonate (BC), vinylene carbonate (VC) or the like is substituted with a fluorine atom(s). As the fluorinated cyclic carbonates, there can be used, more specifically, for example, 4-fluoro-1,3-dioxolan-2-one, (cis- or trans-)4,5-difluoro-1,3-dioxolan-2-one, 4,4-difluoro-1,3-dioxolan-2-one and 4-fluoro-5-methyl-1,3-dioxolan-2-one. The cyclic carbonate is, among those listed in the above, from the viewpoint of the voltage resistance and the conductivity, preferably ethylene carbonate, propylene carbonate, compounds obtained by partially fluorinating these carbonates, and the like; and ethylene carbonate is more preferable. The cyclic carbonate can be used singly or concurrently in two or more.

The content of the cyclic carbonate is, from the viewpoint of the effect of raising the dissociation of a supporting salt and the effect of raising the conductivity of the electrolyte, preferably 0.1 to 70 vol % in the nonaqueous electrolyte, more preferably 0.5 to 60 vol %, and still more preferably 1 to 50 vol %.

The chain carbonate is not especially limited, but examples thereof include dimethyl carbonate (DMC), ethyl methyl carbonate (EMC), diethyl carbonate (DEC) and dipropyl carbonate (DPC). Further the chain carbonate includes fluorinated chain carbonates. Examples of the fluorinated chain carbonates include compounds in which part or the whole of hydrogen atoms of ethyl methyl carbonate (EMC), dimethyl carbonate (DMC), diethyl carbonate (DEC), dipropyl carbonate (DPC) or the like is substituted with a fluorine atom(s). More specific examples of the fluorinated chain carbonate include bis(fluoroethyl) carbonate, 3-fluoropropyl methyl carbonate and 3,3,3-trifluoropropyl methyl carbonate. Among these, dimethyl carbonate is preferable from the viewpoint of the voltage resistance and the conductivity. The chain carbonate can be used singly or concurrently in two or more.

The chain carbonate has an effect of reducing the viscosity of the electrolyte, and can raise the conductivity of the electrolyte. From these viewpoints, the content of the chain carbonate is preferably 0 to 90 vol % in the nonaqueous electrolyte, more preferably 0.01 to 70 vol %, and still more preferably 0.02 to 40 vol %.

The carboxylate ester is not especially limited, but examples thereof include ethyl acetate, methyl propionate, ethyl formate, ethyl propionate, methyl butyrate, ethyl butyrate, methyl acetate and methyl formate. The carboxylate ester further includes fluorinated carboxylate esters. Examples of the fluorinated carboxylate esters include compounds in which part or the whole of hydrogen atoms of ethyl acetate, methyl propionate, ethyl formate, ethyl propionate, methyl butyrate, ethyl butyrate, methyl acetate and methyl formate is substituted with a fluorine atom(s). These compounds are, for example, ethyl pentafluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, methyl 3,3,3-trifluoropropionate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl) butyrate, methyl tetrafluoro-2-(methoxy)propionate, 3,3,3-trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate and ethyl trifluoroacetate. Among these, from the viewpoint of the voltage resistance, the boiling point and the like, preferable are ethyl propionate, methyl acetate, methyl 2,2,3,3-tetrafluoropropionate, 2,2,3,3-tetrafluoropropyl trifluoroacetate and the like. The carboxylate ester has the effect of reducing the viscosity of the electrolyte as in the chain carbonate and the chain ether. Therefore, for example, the carboxylate ester is allowed to be used in place of the chain carbonate and the chain ether, and is allowed to be used concurrently with the chain carbonate and the chain ether.

The content of the carboxylate ester is preferably 0 to 50 vol % in the nonaqueous electrolyte, more preferably 0.01 to 20 vol %, and still more preferably 0.02 to 15 vol %.

The cyclic carboxylate ester is not especially limited, but preferable are, for example, γ-lactones such as γ-butyrolactone, α-methyl-γ-butyrolactone and 3-methyl-γ-butyrolactone, β-propiolactone, and δ-valerolactone. Fluorinated substances thereof may be used. The content of the cyclic carboxylate ester is preferably 0 to 50 vol % in the nonaqueous electrolyte, more preferably 0.01 to 20 vol %, and still more preferably 0.02 to 15 vol %.

The cyclic ether is not especially limited, but preferable are, for example, tetrahydrofuran, 2-methyltetrahydrofuran, 1,3-dioxolane and 2-methyl-1,3-dioxolane. Also partially fluorinated ones, such as 2,2-bis(trifluoromethyl)-1,3-dioxolane, 2-(trifluoroethyl)dioxolane, are allowed to be used. The content of the cyclic ether is preferably 0 to 70 vol % in the nonaqueous electrolyte, more preferably 0.01 to 50 vol %, and still more preferably 0.1 to 40 vol %.

Examples of the phosphate ester include trimethyl phosphate, triethyl phosphate and tributyl phosphate.

The content of the phosphate ester is, from the viewpoint of the compatibility and the viscosity of the electrolyte, preferably 0 to 40 vol % of the nonaqueous electrolyte, more preferably 0.1 to 30 vol %, and still more preferably 1 to 20 vol %.

The nonaqueous electrolyte may contain, other than the above, the following. The nonaqueous electrolyte may contain, for example, an aprotic organic solvent such as non-fluorinated chain ethers such as 1,2-ethoxyethane (DEE) or ethoxymethoxyethane (EME), dimethyl sulfoxide, formamide, acetamide, dimethylformamide, acetonitrile, propylnitrile, nitromethane, ethylmonoglyme, trimethoxymethane, dioxolane derivatives, 1,3-dimethyl-2-imidazolidinone, 3-methyl-2-oxazolidinone, propylene carbonate derivatives, tetrahydrofuran derivatives, ethyl ether, 1,3-propanesultone, anisole, or N-methylpyrrolidone.

Examples of the supporting salt include lithium salts such as $LiPF_6$, $LiAsF_6$, $LiAlCl_4$, $LiClO_4$, $LiBF_4$, $LiSbF_6$, LiCF$_3$SO$_3$, LiC$_4$F$_9$SO$_3$, LiC(CF$_3$SO$_2$)$_2$, LiN(CF$_3$SO$_2$)$_2$, LiN(C$_2$F$_5$SO$_2$)$_2$ and LiB$_{10}$Cl$_{10}$. Examples of the supporting salt additionally include lithium lower-aliphatic carboxylate, chloroborane lithium, lithium tetraphenylborate, LiBr, LiI, LiSCN and LiCl. The supporting salt can be used singly or in combinations of two or more.

An ion-conductive polymer can further be added to the nonaqueous electrolyte. Examples of the ion-conductive polymer include polyethers such as polyethylene oxide and polypropylene oxide, and polyolefins such as polyethylene and polypropylene. As the ion-conductive polymer, there can further be used, for example, polyvinylidene fluoride, polytetrafluoroethylene, polyvinyl fluoride, polyvinyl chloride, polyvinylidene chloride, polymethyl methacrylate, polymethyl acrylate, polyvinyl alcohol, polymethacrylonitrile, polyvinyl acetate, polyvinylpyrrolidone, polycarbonate, polyethylene terephthalate, polyhexamethylene adipamide, polycaprolactam, polyurethane, polyethyleneimine, polybutadiene, polystyrene, polyisoprenes or derivatives thereof. The ion-conductive polymer can be used singly or in combinations of two or more. There may further be used polymers containing various types of monomers constituting the above polymers.

An electrolyte additive can further be added to the nonaqueous electrolyte. Examples of the additive include cyclic carbonate-based additives such as vinylene carbonate, sulfur compound-based additives such as 1,3-propanesultone, cyclic disulfonate esters and chain sulfonate esters, boron-based additives such as lithium bis(oxalate)borate, and imide-based additives such as lithium bis sulfonylimide.

(Positive Electrode)

A positive electrode active material is not especially limited, but examples thereof include spinel-based materials, layer materials and olivine-based materials.

Examples of the spinel-based material include LiMn$_{2-x}$M$_x$O$_4$ (in the formula, 0<x<0.3, and M includes at least one selected from Li, Al, B, Mg, Si, a transition metal and the like) in which part of Mn of LiMn$_2$O$_4$ is substituted and the life is elongated and which operates at about 4 V with respect to lithium, and a material represented by the following formula (5) which operates at potentials of 4.5 V or higher with respect to lithium.

$$\text{Li}_a(\text{M}_x\text{Mn}_{2-x-y}\text{Y}_y)(\text{O}_{4-w}\text{Z}_w) \quad (5)$$

wherein 0.4≤x≤1.2, 0≤y, x+y<2, 0≤a≤1.2, and 0≤w≤1; M is a transition metal element, and includes at least one selected from the group consisting of Co, Ni, Fe, Cr and Cu; Y is a metal element, and includes at least one selected from the group consisting of Li, B, Na, Al, Mg, Ti, Si, K and Ca; and Z is a halogen element, and includes at least one selected from the group consisting of F and Cl.

In the formula (5), M includes preferably 80% or more of the elements exemplified in the above, and more preferably 90% or more thereof, and may be 100% thereof. Further Y and Z each contain preferably 80% or more of the elements exemplified in the above, and more preferably 90% or more thereof, and may be 100% thereof.

The olivine-based material is represented by the general formula:

$$\text{LiMPO}_4 \quad (6)$$

wherein M is a transition metal element, and more preferably includes at least one selected from Co and Ni.

Specific examples of the olivine-based material include LiFePO$_4$, LiMnPO$_4$, LiCoPO$_4$ and LiNiPO$_4$, and there can also be used materials in which these transition metals are partially substituted with other elements, and materials in which the oxygen moiety is substituted with fluorine. In the formula (6), M includes preferably 80% or more of the elements exemplified in the above, and more preferably 90% or more thereof; and as other elements, for example, Fe also is preferably contained.

Examples of the layer material include the following.

$$\text{Li}(\text{M}_{1-z}\text{Mn}_z)\text{O}_2 \quad (7)$$

wherein 0.33≤z≤0.7; and M is a metal element, and includes at least one selected from Li, Co and Ni.

$$\text{Li}(\text{Li}_x\text{M}_{1-x-z}\text{Mn}_z)\text{O}_2 \quad (8)$$

wherein 0.1≤x<0.3, 0.33≤z≤0.7; and M is a metal element, and includes at least one selected from Co and Ni.

There can also be used materials in which these transition metals are partially substituted with other elements, and materials in which the oxygen moiety is substituted with fluorine. In the formula (7) and the formula (8), M includes preferably 80% or more of the elements exemplified in the above, and more preferably 90% or more thereof.

Other than these, NASICON-type materials, lithium-transition metal-silicon complex oxides and the like can be used.

The positive electrode active material can be used singly or as a mixture of two or more.

The specific surface area of the positive electrode active material is, for example, 0.01 to 5 m$^2$/g, preferably 0.05 to 4 m$^2$/g, more preferably 0.1 to 3 m$^2$/g, and still more preferably 0.15 to 2 m$^2$/g. The specific surface area in such a range allows the contact area with the electrolyte to be regulated in a proper range. That is, by making the specific surface area 0.01 m$^2$/g or larger, it becomes easy for the intercalation/deintercalation of lithium ions to be smoothly carried out, and the resistance can be reduced more. Further by making the specific surface area 5 m$^2$/g or smaller, accelerated decomposition of the electrolyte and dissolution of the constituting elements of the active material can be suppressed.

The median particle diameter of the lithium-manganese complex oxide is preferably 0.01 to 50 μm, and more preferably 0.02 to 40 μm. By making the particle diameter 0.02 μm or larger, the dissolving-out of the constituting elements of the active material can be suppressed more, and the deterioration due to contact with the electrolyte can be suppressed more. Further by making the particle diameter 50 μm or smaller, it becomes easy for the intercalation/deintercalation of lithium ions to be smoothly carried out, and the resistance can be reduced more. The particle diameter can be measured by a laser diffraction scattering-type particle size analyzer.

A positive electrode binder is not especially limited, but examples thereof include polyvinylidene fluoride (PVdF), vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide and polyamideimide.

Among these, from the viewpoint of the versatility and the low cost, polyvinylidene fluoride is preferable. The amount of the positive electrode binder to be used is, from the viewpoint of "a sufficient binding power" and "the energy enhancement," which are in a tradeoff relationship, preferably 2 to 10 parts by mass with respect to 100 parts by mass of the positive electrode active material.

A conductive auxiliary material may be added to a positive electrode active material layer containing the positive electrode active material for the purpose of reducing the resistance. Examples of the conductive auxiliary material include carbonaceous fine particles of graphite, carbon black or acetylene black.

A positive electrode current collector is preferably aluminum, nickel, silver or an alloy thereof. Examples of the shape thereof include foils, flat plates and mesh-forms.

A positive electrode can be obtained by dispersing and kneading the above positive electrode active material together with a conductive substance and the binder in a solvent, and applying the resultant on the positive electrode current collector.

(Negative Electrode)

A negative electrode is not especially limited as long as being one containing a material capable of absorbing and desorbing lithium.

A negative electrode active material is not especially limited, and examples thereof include carbon materials (a) capable of absorbing and desorbing lithium ions, metals (b) alloyable with lithium, and metal oxides (c) capable of absorbing and desorbing lithium ions.

As the carbon material (a), there can be used graphite, amorphous carbon, diamond-like carbon, carbon nanotubes and composites thereof. Here, graphite, having a high crystallinity, is high in the electroconductivity, and is excellent in its adhesivity with a negative electrode current collector composed of a metal such as copper, and in the voltage flatness. On the other hand, amorphous carbon having a low crystallinity, because of having a comparatively small volume expansion, has a large effect of relaxing the volume expansion of the negative electrode as a whole, and hardly causes the deterioration due to heterogeneity such as crystal grain boundaries and defects. The carbon material (a) can be used singly or concurrently with another substance. In one embodiment of the concurrent use thereof with another substance, for example, the carbon material (a) is preferably in the range of 2 mass % or more and 80 mass % or less in the negative electrode active material, and more preferably in the range of 2 mass % or more and 30 mass % or less.

As the metal (b), there can be used a metal having, as its main component, Al, Si, Pb, Sn, Zn, Cd, Sb, In, Bi, Ag, Ba, Ca, Hg, Pd, Pt, Te or La, an alloy of two or more thereof, an alloy of the metal or the alloy with lithium, or the like. It is especially preferable that silicon (Si) is contained as the metal (b). The metal (b) can be used singly or concurrently with other substances, but is preferably in the range of 5 mass % or more and 90 mass % or less in the negative electrode active material, and more preferably in the range of 20 mass % or more and 50 mass % or less.

As the metal oxide (c), there can be used silicon oxide, aluminum oxide, tin oxide, indium oxide, zinc oxide, lithium oxide or a composite thereof. It is especially preferable that silicon oxide is contained as the metal oxide (c). This is because silicon oxide is comparatively stable and hardly causes reactions with other compounds. One or two or more elements selected from nitrogen, boron and sulfur may further be added, for example, in 0.1 to 5 mass % to the metal oxide (c). Thereby, the electroconductivity of the metal oxide (c) can be improved. The metal oxide (c) can be used singly or concurrently with other substances. The metal oxide (c) is preferably in the range of 5 mass % or more and 90 mass % or less in the negative electrode active material, and more preferably in the range of 40 mass % or more and 70 mass % or less.

Specific examples of the metal oxide (c) include $LiFe_2O_3$, $WO_2$, $MoO_2$, $SiO$, $SiO_2$, $CuO$, $SnO$, $SnO_2$, $Nb_3O_5$, $Li_xTi_{2-x}O_4$ ($1 \leq x \leq 4/3$), $PbO_2$ and $Pb_2O_5$.

Further examples of the negative electrode active material include metal sulfides (d) capable of absorbing and desorbing lithium ions. Examples of the metal sulfide (d) include $SnS$ and $FeS_2$. Further as the negative electrode active material, there can be used, for example, metallic lithium or a lithium alloy, polyacene or polythiophene, or a lithium nitride such as $Li_5(Li_3N)$, $Li_7MnN_4$, $Li_3FeN_2$, $Li_{2.5}Co_{0.5}N$ or $Li_3CoN$.

The above negative electrode active material can be used singly or as a mixture of two or more.

Further the negative electrode active material can have a constitution containing the carbon material (a), the metal (b) and the metal oxide (c). Hereinafter, this negative electrode active material will be described.

It is preferable that the whole of or part of the metal oxide (c) has an amorphous structure. The metal oxide (c) having an amorphous structure can suppress the volume expansion of the carbon material (a) and the metal (b), and can suppress the decomposition of the electrolyte. The mechanism is presumed to be that when the metal oxide (c) has an amorphous structure, it has some influence on the film formation at the interface between the carbon material (a) and the electrolyte. Further the amorphous structure conceivably gives a comparatively small factor due to the heterogeneity such as crystal grain boundaries and defects. Here, it can be confirmed by X-ray diffractometry (usual XRD measurement) that the whole of or part of the metal oxide (c) has an amorphous structure. Specifically, when the metal oxide (c) does not have an amorphous structure, a peak characteristic to the metal oxide (c) is observed but when the whole of or part of the metal oxide (c) has an amorphous structure, the peak characteristic to the metal oxide (c) is observed as a broad one.

It is preferable that the metal oxide (c) is an oxide of a metal constituting the metal (b). It is also preferable that the metal (b) and the metal oxide (c) are silicon (Si) and silicon oxide (SiO), respectively.

It is preferable that the whole of or part of the metal (b) is dispersed in the metal oxide (c). When at least part of the metal (b) is dispersed in the metal oxide (c), the volume expansion of the negative electrode as a whole can be suppressed more, and the decomposition of the electrolyte can be also suppressed. Here, it can be confirmed by the concurrent use of a transmission electron microscope observation (usual TEM observation) and an energy dispersive X-ray spectroscopy (usual EDX measurement) that the whole of or part of the metal (b) is dispersed in the metal oxide (c). Specifically, a cross-section of a sample containing the metal (b) particles is observed and the oxygen concentration of the metal (b) particles dispersed in the metal oxide (c) is measured; and it can be confirmed that the metal constituting the metal (b) particles does not turn to an oxide.

It is preferable as described above that the contents of the carbon material (a), the metal (b) and the metal oxide (c) with respect to the total of the carbon material (a), the metal (b) and the metal oxide (c) are 2 mass % or higher and 100 mass % or lower, 0 mass % or higher and 95 mass % or lower and 0 mass % or higher and 95 mass % or lower, respectively. It is more preferable that the contents of the carbon material (a), the metal (b) and the metal oxide (c) with respect to the total of the carbon material (a), the metal (b) and the metal oxide (c) are 2 mass % or higher and 100 mass % or lower, 0 mass % or higher and 90 mass % or lower and 0 mass % or higher and 90 mass % or lower, respectively.

A negative electrode active material in which the whole of or part of the metal oxide (c) is of an amorphous structure, and the whole of or part of the metal (b) is dispersed in the metal oxide (c) can be fabricated, for example, by a method as disclosed in Japanese Patent Laid-Open No. 2004-47404. That is, by subjecting the metal oxide (c) to a CVD treatment in an atmosphere containing an organic gas such as methane gas, there can be obtained a composite in which the metal (b) in the metal oxide (c) is turned to nanoclusters, and the surface thereof is coated with the carbon material (a). Alternatively, the negative electrode active material can be fabricated also by mixing the carbon material (a), the metal (b) and the metal oxide (c) by mechanical milling.

As the carbon material (a), the metal (b) and the metal oxide (c), there can be used several particulate ones, though not being especially limited. For example, the constitution can be made such that the average particle diameter of the metal (b) is smaller than that of the carbon material (a) and that of the metal oxide (c). Thereby, since the metal (b), which has a large volume change in the charge and discharge, comes to be of a relatively small particle diameter, and the carbon material (a) and the metal oxide (c), which have a small volume change, come to be of a relatively large particle diameter, the dendrite formation and the alloy microparticulation can effectively be suppressed. Further in the charge and discharge process, lithium comes to be absorbed in and desorbed from in order of large-particle diameter particles, small-particle diameter particles and large-particle diameter particles. Also from this point, the generation of the residual stress and residual strain is suppressed. The average particle diameter of the metal (b) can be made to be 20 μm or smaller, and 15 μm or smaller is preferable.

Further it is preferable that the average particle diameter of the metal oxide (c) is ½ or smaller of that of the carbon material (a), and it is preferable that the average particle diameter of the metal (b) is ½ or smaller of that of the metal oxide (c). Further it is more preferable that the average particle diameter of the metal oxide (c) is ½ or smaller of that of the carbon material (a), and the average particle diameter of the metal (b) is ½ or smaller of that of the metal oxide (c). When the average particle diameter is controlled in such a range, the effect of relaxing the volume expansion of the metal and alloy phases can more effectively be attained, and there can be obtained a secondary battery excellent in the balance among the energy density, the cycle life and the efficiency. More specifically, it is preferable that the average particle diameter of a silicon oxide (c) is made to be ½ or smaller of that of a graphite (a), and the average particle diameter of silicon (b) is made to be ½ or smaller of that of the silicon oxide (c). Further, more specifically, the average particle diameter of the silicon (b) can be made to be, for example, 20 μm or smaller, and is preferably made to be 15 μm or smaller.

A negative electrode binder is not especially limited, but examples thereof include polyvinylidene fluoride (PVdF), vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide and polyamideimide.

The content of the negative electrode binder is, with respect to the total amount of the negative electrode active material and the negative electrode binder, preferably in the range of 1 to 30 mass %, and more preferably 2 to 25 mass %. By making the content 1 mass % or higher, the adhesivity between the active materials or between the active material and the current collector is improved and the cycle characteristics become good. Further by making the content 30 mass % or lower, the ratio of the active material increases and the negative electrode capacity can be improved.

A negative electrode current collector is not especially limited, but is, from the viewpoint of the electrochemical stability, preferably aluminum, nickel, copper, silver or an alloy thereof. Examples of the shape thereof include foils, flat plates and mesh-forms.

The negative electrode can be fabricated by forming a negative electrode active material layer containing the negative electrode active material and the negative electrode binder on the negative electrode current collector. Examples of methods for forming the negative electrode active material layer include a doctor blade method, a die coater method, a CVD method and a sputtering method. The negative electrode current collector may be made by in advance forming the negative electrode active material layer, and thereafter forming a thin film of aluminum, nickel or an alloy thereof by vapor deposition, sputtering or the like.

(Separator)

A secondary battery may be constituted of a combination of the positive electrode, the negative electrode, a separator and the nonaqueous electrolyte. Examples of the separator include woven fabric, nonwoven fabric, porous polymer membranes of a polyolefin such as polyethylene or polypropylene, polyimide, porous polyvinylidene fluoride, and ionic conductive polymer electrolyte membranes. These can be used singly or in combinations thereof.

(Shape of the Battery)

Examples of the shape of the battery include cylindrical, rectangular, coin-form, button-form and laminate-form ones. Examples of an outer package of the battery include stainless steel, iron, aluminum and titanium ones, ones of alloys thereof, and plated products thereof. The plating usable is, for example, nickel plating.

Further, examples of a laminate resin film to be used in the laminate-form battery include aluminum, aluminum alloy and titanium foils. Examples of a material of a thermal fusion portion of a metal laminate resin film include thermoplastic polymer materials such as polyethylene, polypropylene and polyethylene terephthalate. A metal laminate resin layer or a metal foil layer is not limited to one layer, and may be of two or more layers.

FIG. 1 illustrates a constitution of a secondary battery according to the present embodiment. The lithium secondary battery has a positive electrode active material layer 1 containing a positive electrode active material on a positive electrode current collector 3 composed of a metal such as an aluminum foil, and a negative electrode active material layer 2 containing a negative electrode active material on a negative electrode current collector 4 composed of a metal such as a copper foil. The positive electrode active material layer 1 and the negative electrode active material layer 2 are arranged facing to each other through an electrolyte and a separator 5 containing the electrolyte, composed of a nonwoven fabric, a polypropylene microporous membrane or the like. In FIG. 1, reference numerals 6 and 7 denote outer packages; reference numeral 8 denotes a negative electrode tab; and reference numeral 9 denotes a positive electrode tab.

EXAMPLES

Hereinafter, specific Examples to which the present invention is applied will be described, but the present invention is not limited to the present Examples, and is allowed to be carried out under suitable changes and modifications in the scope not exceeding its gist. FIG. 1 is a schematic view illustrating a constitution of a lithium secondary battery fabricated in the present Examples.

In Table 1, there are indicated, fluorine-containing ether compounds used in the present Examples and abbreviations thereof, and fluorine substitution rates thereof (the ratio of the number of fluorine atoms to the sum total of the numbers of hydrogen atoms and the fluorine atoms in the fluorine-containing ether compound).

TABLE 1

| Abbreviation | Name of Fluorine-Containing Ether Compound | Fluorine Substitution Rate [%] |
|---|---|---|
| FE01 | 1,1,2,2-tetrafluoroethyl-2,2,3,3-tetrafluoropropyl ether | 66.7 |
| FE02 | 2,2,3,4,4,4-hexafluorobutyl-difluoromethyl ether | 66.7 |
| FE03 | 1,1-difluoroethyl-2,2,3,3-tetrafluoropropyl ether | 50.0 |
| FE04 | 1,1,1,2,3,3-hexafluoropropyl-2,2-difluoroethyl ether | 66.7 |
| FE05 | 1,1-difluoroethyl-1H,1H-heptafluorobutyl ether | 64.3 |
| FE06 | 1H,1H,2'H,3H-decafluorodipropyl ether | 71.4 |
| FE07 | bis(2,2,3,3,3-pentafluoropropyl) ether | 71.4 |
| FE08 | 1H,1H,5H-perfluoropentyl-1,1,2,2-tetrafluoroethyl ether | 75.0 |
| FE09 | bis(1H,1H-heptafluorobutyl) ether | 77.8 |
| FE10 | 1H,1H,2'H-perfluorodipropyl ether | 78.6 |
| FE11 | 1,1,2,3,3,3-hexafluoropropyl-1H,1H-heptafluorobutyl ether | 81.3 |
| FE12 | 1H-perfluorobutyl-1H-perfluoroethyl ether | 85.7 |

Example 1

$LiNi_{0.5}Mn_{1.35}Ti_{0.15}O_4$ (90 mass %) as a positive electrode active material, a polyvinylidene fluoride (PVdF, 5 mass %) as a binder, and a carbon black (5 mass %) as a conductive agent were mixed to thereby make a positive electrode mixture. The positive electrode mixture was dispersed in N-methyl-2-pyrrolidone to thereby prepare a positive electrode slurry. The positive electrode slurry was applied uniformly on one surface of an aluminum current collector having a thickness of 20 μm. The thickness of the applied film was so regulated that the first-time charge capacity per unit area became 2.5 mAh/cm². The applied film was dried and thereafter compression-molded by a roll press to thereby fabricate a positive electrode.

An artificial graphite was used as a negative electrode active material. The artificial graphite was dispersed in a solution in which PVdF as a binder was dissolved in N-methylpyrrolidone to thereby prepare a negative electrode slurry. The mass ratio of the negative electrode active material to the binder was made to be 90/10. The negative electrode slurry was applied uniformly on a Cu current collector having a thickness of 10 μm. The thickness of the applied film was so regulated that the first-time charge capacity became 3.0 mAh/cm². The applied film was dried and thereafter compression-molded by a roll press to thereby fabricate a negative electrode.

The positive electrode and the negative electrode each cut out into 3 cm×3 cm were arranged facing to each other through a separator. The used separator was a microporous polypropylene film having a thickness of 25 μm.

As a solvent of a nonaqueous electrolyte, there was used a solution in which ethylene carbonate (EC), tris(2,2,2-trifluoroethyl)phosphate (FP1), and two fluorine-containing ether compounds (FE01, FE06) indicated in Table 1 were mixed in a volume ratio of EC/FP1/FE01/FE06=20/30/45/5. $LiPF_6$ was dissolved in a concentration of 0.8 mol/l in the nonaqueous electrolytic solvent to thereby prepare an electrolyte.

The above positive electrode, negative electrode, separator and electrolyte were arranged in a laminate outer package, and the laminate was sealed to thereby fabricate a lithium secondary battery. A tab was connected to each of the positive electrode and the negative electrode, so that the battery was put in the state of being electrically connected with the outside of the laminate.

(Cycle Characteristics)

The battery was charged at 20 mA. After the battery voltage reached 4.75 V of an upper limit voltage, the battery was charged at a constant current until the entire charge time reached 2.5 hours. Thereafter, the battery was discharged at 20 mA of a constant current until the battery voltage reached 3 V of a lower limit voltage. This charge and discharge was repeated 200 times. The cell was put in a thermostatic chamber at 45° C., and the charge and discharge was carried out. The ratio of a capacity at the 200th cycle to a capacity at the first cycle (a capacity at the 200th cycle/a capacity at the first cycle) was evaluated as a capacity maintenance rate at 45° C. after 200 cycles. The result is shown in Table 2.

Examples 2 to 16, and Comparative Examples 1 to 7

Then, lithium secondary batteries were fabricated in the same manner as in Example 1, except for altering solvent compositions of nonaqueous electrolytes to compositions in Table 2, and capacity maintenance rates at 45° C. after 200 cycles were evaluated. The results are shown in Table 2.

TABLE 2

| | Electrolyte Solvent Composition (volume ratio) | Capacity Maintenance Rate at 45° C. after 200 Cycles |
|---|---|---|
| Comparative Example 1 | EC/FP1/FE01 = 20/30/50 | 75% |
| Example 1 | EC/FP1/FE01/FE06 = 20/30/45/5 | 80% |
| Example 2 | EC/FP1/FE01/FE06 = 20/30/40/10 | 79% |
| Example 3 | EC/FP1/FE01/FE06 = 20/30/30/20 | 76% |
| Example 4 | EC/FP1/FE01/FE12 = 20/30/45/2 | 79% |
| Example 5 | EC/FP1/FE01/FE12 = 20/30/40/5 | 83% |
| Example 6 | EC/FP1/FE01/FE12 = 20/30/30/10 | 79% |
| Comparative Example 2 | EC/FP1/FE01/FE03 = 20/30/45/5 | 74% |
| Example 7 | EC/FP1/FE01/FE07 = 20/30/45/5 | 80% |
| Example 8 | EC/FP1/FE01/FE08 = 20/30/45/5 | 81% |
| Example 9 | EC/FP1/FE01/FE09 = 20/30/45/5 | 81% |
| Example 10 | EC/FP1/FE01/FE10 = 20/30/45/5 | 82% |
| Example 11 | EC/FP1/FE01/FE11 = 20/30/45/5 | 83% |
| Comparative Example 3 | EC/FP1/FE02 = 20/30/50 | 73% |
| Example 12 | EC/FP1/FE02/FE06 = 20/30/45/5 | 79% |
| Comparative Example 4 | EC/PC/FP1/FE03 = 10/10/30/50 | 70% |
| Example 13 | EC/PC/FP1/FE03/FE06 = 10/10/30/45/5 | 79% |
| Comparative Example 5 | EC/PC/FP1/FE04 = 5/5/40/50 | 77% |
| Example 14 | EC/PC/FP1/FE04/FE06 = 5/5/40/40/10 | 80% |
| Comparative Example 6 | EC/PC/FEC/FP1/FE05 = 3/15/2/30/50 | 74% |
| Example 15 | EC/PC/FEC/FP1/FE05/FE11 = 3/15/2/30/45/5 | 81% |

TABLE 2-continued

|  | Electrolyte Solvent Composition (volume ratio) | Capacity Maintenance Rate at 45° C. after 200 Cycles |
|---|---|---|
| Comparative Example 7 | EC/FP1/FE06 = 20/30/50 | 72% |
| Example 16 | EC/FP1/FE06/FE11 = 20/30/40/10 | 78% |

Abbreviations of solvents described in Table 2 are as follows.

FE01 to FE12: which each indicate fluorine-containing ether compounds shown in Table 1.
EC: ethylene carbonate
PC: propylene carbonate
FEC: fluoroethylene carbonate
FP1: tris(2,2,2-trifluoroethyl)phosphate There was observed the life improvement effect by mixing of two fluorine-containing ether compounds. It is conceivable that particularly the addition of a fluorine-containing ether compound having a high fluorine substitution rate improved the oxidation resistance and the characteristics. It is presumed that even in the case of the addition of a small amount of a fluorine-containing ether compound having a high fluorine substitution rate, the deterioration at high potentials was suppressed due to the adsorption of the compound to the positive electrode, and the like. In the case of the addition of a large amount of a fluorine-containing ether compound having a high fluorine substitution rate, the improvement effect of the cycle capacity maintenance rate was low. This is conceivably because since an ether compound having a high fluorine substitution rate was low in the compatibility with other solvents, when the amount of addition was large, separation and deposition of part thereof occurred, and consequently, good cycle characteristics could not be obtained.

(Evaluation of Fluorine-Containing Phosphate Ester Compounds)

Then, the effects by fluorine-containing phosphate ester compounds were evaluated. Abbreviations of the fluorine-containing phosphate ester compounds used are described as follows.
FP1: tris(2,2,2-trifluoroethyl)phosphate
FP2: tris(1H,1H-heptafluorobutyl)phosphate
FP3: tris(2,2,3,3,3-pentafluoropropyl)phosphate Examples 17 to 19, and Comparative Examples 8 and 9

In Table 3, there are shown the results of the evaluation for the homogeneous mixability of electrolytes in respective electrolyte solvent compositions. $LiPF_6$ was used as a supporting salt of the electrolytes, and the concentration was made to be 0.8 mol/l.

TABLE 3

Compatibility Improvement by Addition of Fluorine-Containing Phosphate Ester Compound

|  | Electrolyte Solvent Composition (volume ratio) | Homogeneity and Compatibility of Electrolyte |
|---|---|---|
| Comparative Example 8 | EC/FE01 = 20/80 | phase separation |
| Comparative Example 9 | EC/FE01/FE11 = 20/70/10 | phase separation |
| Example 17 | EC/FP1/FE01/FE11 = 20/30/45/5 | homogeneous mixing |
| Example 18 | EC/FP2/FE01/FE11 = 20/30/45/5 | homogeneous mixing |
| Example 19 | EC/FP3/FE01/FE11 = 20/30/45/5 | homogeneous mixing |

As shown in Comparative Examples 8 and 9, it is difficult for a mixture of a cyclic carbonate and a fluorine-containing ether compound to be homogeneously mixed because of their low compatibility. The addition of a fluorine-containing phosphate ester compound eliminates the phase separation and enables a homogeneously mixed electrolyte to be obtained. The homogeneous electrolyte can provide good battery characteristics. As shown in Table 3, the similar effects on the compatibility improvement could be confirmed in the plurality of fluorine-containing phosphate ester compounds.

Examples 20 and 21, and Comparative Examples 10 and 11

Then, lithium secondary batteries were fabricated in the same manner as in Example 1, except for altering solvent compositions of nonaqueous electrolytes to compositions shown in Table 4, and capacity maintenance rates at 45° C. after 200 cycles were measured to evaluate the cycle characteristics. The results are shown in Table 4.

TABLE 4

Evaluation Examples using Fluorine-Containing Phosphate Ester Compound

|  | Electrolyte Solvent Composition (volume ratio) | Capacity Maintenance Rate at 45° C. after 200 Cycles |
|---|---|---|
| Comparative Example 10 | EC/FP2/FE01 = 20/30/50 | 72% |
| Example 20 | EC/FP2/FE01/FE06 = 20/30/45/5 | 78% |
| Comparative Example 11 | EC/FP3/FE01 = 20/30/50 | 75% |
| Example 21 | EC/FP3/FE01/FE06 = 20/30/45/5 | 80% |

As shown in Table 4, also in the case of using fluorine-containing phosphate ester compounds different in kind from FP1, it was confirmed that the incorporation of two fluorine-containing ether compounds in the electrolyte gave the improvement effect of the cycle characteristics.

(Evaluation of Sulfone Compounds)

Then, there were studied electrolytes using sulfone compounds in place of the fluorine-containing phosphate ester compounds. Abbreviations of sulfone compounds used are described as follows.
SL: sulfolane
DMS: dimethyl sulfone
EMS: ethyl methyl sulfone
DES: diethyl sulfone Examples 22 and 23, and Comparative Example 12

In Table 5, there are shown the results of the evaluation for the homogeneous mixability of electrolytes in respective electrolyte solvent compositions. LiPF$_6$ was used as a supporting salt of the electrolytes, and the concentration was made to be 0.8 mol/l.

TABLE 5

Compatibility Improvement by Addition of Sulfone Compound

| | Electrolyte Solvent Composition (volume ratio) | Homogeneity and Compatibility of Electrolyte |
|---|---|---|
| Comparative Example 12 | EC/FE01 = 30/70 | phase separation |
| (Reference Example) | EC/SL/FE01 = 15/15/70 | homogeneous mixing |
| Example 22 | EC/SL/FE01/FE06 = 10/20/65/5 | homogeneous mixing |
| (Reference Example) | EC/DMS/FE01 = 15/15/70 | homogeneous mixing |
| Example 23 | EC/DMS/FE01/FE06 = 15/15/65/5 | homogeneous mixing |

Examples 24 to 28, and Comparative Examples 13 to 17

Then, lithium secondary batteries were fabricated in the same manner as in Example 1, except for altering solvent compositions of nonaqueous electrolytes to compositions in Table 6, and capacity maintenance rates at 45° C. after 200 cycles were measured to evaluate the cycle characteristics. The results of the evaluations using the electrolytes in Table 6 are shown. LiPF$_6$ was used as a supporting salt of the electrolytes, and the concentration was made to be 0.8 mol/l.

TABLE 6

Evaluation Examples using Various Sulfone Compounds
(Examples of Improvement of Capacity Maintenance Rate)

| | Electrolyte Solvent Composition (volume ratio) | Capacity Maintenance Rate at 45° C. after 200 Cycles |
|---|---|---|
| Comparative Example 13 | EC/SL/FE01 = 10/30/60 | 75% |
| Example 24 | EC/SL/FE01/FE06 = 10/30/55/5 | 80% |
| Comparative Example 14 | EC/DMS/FE01 = 10/30/60 | 72% |
| Example 25 | EC/DMS/FE01/FE06 = 10/30/55/5 | 76% |
| Comparative Example 15 | EC/EMS/FE01 = 10/30/60 | 70% |
| Example 26 | EC/EMS/FE01/FE06 = 10/30/55/5 | 75% |
| Comparative Example 16 | EC/DES/FE01 = 10/30/60 | 69% |
| Example 27 | EC/DES/FE01/FE06 = 10/30/55/5 | 74% |
| Comparative Example 17 | EC/PC/SL/FP1/FE01 = 5/5/20/30/40 | 73% |
| Example 28 | EC/PC/SL/FP1/FE01/FE06 = 5/5/20/30/35/5 | 79% |

As shown in Table 6, also in the electrolytes in which a sulfone compound is, or a sulfone compound and a fluorine-containing phosphate ester compound both are added, the incorporation of the plurality of fluorine-containing ether compounds gave the improvement effect of the cycle characteristics.

Evaluation of Positive Electrode Active Materials

Examples 29 to 40, and Comparative Examples 18 to 29

The similar experiments were carried out by changing the positive electrode active materials. Batteries were fabricated in the same manner as in Example 1, except for using materials shown in Table 7 as positive electrode active materials, and altering solvent compositions of nonaqueous electrolytes to compositions shown in Table 7. LiPF$_6$ was used as a supporting salt of the electrolytes, and the concentration was made to be 0.8 mol/l. The charge and discharge range was made to be a range shown in Table 7 as a charge and discharge voltage range such that the positive electrode active materials could be provided with a sufficient capacity and life characteristics, and capacity maintenance rates at 45° C. after 200 cycles were evaluated in the same manner as in Example 1. The results are shown in Table 7.

TABLE 7

Results of Evaluation by Changing Positive Electrode Active Materials

| | Positive Electrode Active Materials | Electrolyte Solvent Composition (volume ratio) | Charge and Discharge Range (charge upper limit voltage-discharge lower limit voltage) | Capacity Maintenance Rate at 45° C. after 200 Cycles |
|---|---|---|---|---|
| Comparative Example 18 | LiNi$_{0.5}$Mn$_{1.5}$O$_4$ | EC/PC/FP1/FE01 = 10/10/30/50 | 4.75 V-3 V | 69% |
| Example 29 | LiNi$_{0.5}$Mn$_{1.5}$O$_4$ | EC/PC/FP1/FE01/FE10 = 10/10/30/40/10 | 4.75 V-3 V | 73% |
| Comparative Example 19 | LiNi$_{0.4}$Co$_{0.2}$Mn$_{1.4}$O$_4$ | EC/PC/FP1/FE01 = 10/10/30/50 | 4.9 V-3 V | 56% |
| Example 30 | LiNi$_{0.4}$Co$_{0.2}$Mn$_{1.4}$O$_4$ | EC/PC/FP1/FE01/FE10 = 10/10/30/40/10 | 4.9 V-3 V | 63% |
| Comparative Example 20 | LiNi$_{0.35}$Fe$_{0.3}$Mn$_{1.35}$O$_4$ | EC/PC/FP1/FE02 = 5/15/30/50 | 4.9 V-3 V | 58% |
| Example 31 | LiNi$_{0.35}$Fe$_{0.3}$Mn$_{1.35}$O$_4$ | EC/PC/FP1/FE02/FE07 = 5/15/30/40/10 | 4.9 V-3 V | 66% |
| Comparative Example 21 | LiNi$_{0.5}$Mn$_{1.45}$Al$_{0.05}$O$_{3.97}$F$_{0.03}$ | EC/PC/FP1/FE02 = 5/15/20/60 | 4.75 V-3 V | 72% |

TABLE 7-continued

Results of Evaluation by Changing Positive Electrode Active Materials

|  | Positive Electrode Active Materials | Electrolyte Solvent Composition (volume ratio) | Charge and Discharge Range (charge upper limit voltage-discharge lower limit voltage) | Capacity Maintenance Rate at 45° C. after 200 Cycles |
|---|---|---|---|---|
| Example 32 | $LiNi_{0.5}Mn_{1.45}Al_{0.05}O_{3.97}F_{0.03}$ | EC/PC/FP1/FE02/FE07 = 5/15/20/50/10 | 4.75 V-3 V | 78% |
| Comparative Example 22 | $LiNi_{0.5}Mn_{1.45}Mg_{0.05}O_4$ | EC/FP1/FE02 = 10/40/50 | 4.75 V-3 V | 74% |
| Example 33 | $LiNi_{0.5}Mn_{1.45}Mg_{0.05}O_4$ | EC/FP1/FE02/FE09 = 10/40/40/10 | 4.75 V-3 V | 81% |
| Comparative Example 23 | $LiNi_{0.5}Mn_{1.49}B_{0.01}O_4$ | EC/PC/FP1/FE04 = 10/10/30/50 | 4.75 V-3 V | 73% |
| Example 34 | $LiNi_{0.5}Mn_{1.49}B_{0.01}O_4$ | EC/PC/FP1/FE04/FE09 = 10/10/30/40/10 | 4.75 V-3 V | 79% |
| Comparative Example 24 | $LiNi_{0.5}Mn_{1.25}Ti_{0.25}O_4$ | EC/PC/FP1/FE05 = 5/5/30/60 | 4.75 V-3 V | 79% |
| Example 35 | $LiNi_{0.5}Mn_{1.25}Ti_{0.25}O_4$ | EC/PC/FP1/FE05/FE11 = 5/5/30/50/10 | 4.75 V-3 V | 84% |
| Comparative Example 25 | $LiNi_{0.5}Mn_{1.49}Li_{0.01}O_4$ | EC/PC/FP1/FE05 = 5/15/30/50 | 4.75 V-3 V | 72% |
| Example 36 | $LiNi_{0.5}Mn_{1.49}Li_{0.01}O_4$ | EC/PC/FP1/FE05/FE11 = 5/15/30/40/10 | 4.75 V-3 V | 79% |
| Comparative Example 26 | $Li(Li_{0.15}Ni_{0.2}Co_{0.1}Mn_{0.55})O_2$ | EC/FP1/FE01 = 20/30/50 | 4.6 V-3 V | 67% |
| Example 37 | $Li(Li_{0.15}Ni_{0.2}Co_{0.1}Mn_{0.55})O_2$ | EC/FP1/FE01/FE10 = 20/30/40/10 | 4.6 V-3 V | 73% |
| Comparative Example 27 | $LiCoPO_4$ | EC/PC/FP1/FE01 = 10/10/30/50 | 5.0 V-3 V | 63% |
| Example 38 | $LiCoPO_4$ | EC/PC/FP1/FE01/FE12 = 10/10/30/40/10 | 5.0 V-3 V | 68% |
| Comparative Example 28 | $Li(Ni_{0.4}Co_{0.3}Mn_{0.3})O_2$ | EC/FP1/FE01 = 30/30/40 | 4.4 V-3 V | 77% |
| Example 39 | $Li(Ni_{0.4}Co_{0.3}Mn_{0.3})O_2$ | EC/FP1/FE01/FE11 = 30/30/30/10 | 4.4 V-3 V | 81% |
| Comparative Example 29 | 80%-$Li(Li_{0.1}Mn_{1.9})O_4$ + 20%-$LiNi_{0.8}Co_{0.2}O_2$ | EC/FP1/FE01 = 20/30/50 | 4.2 V-3 V | 85% |
| Example 40 | 80%-$Li(Li_{0.1}Mn_{1.9})O_4$ + 20%-$LiNi_{0.8}Co_{0.2}O_2$ | EC/FP1/FE01/FE12 = 20/30/40/10 | 4.2 V-3 V | 86% |

The effect of improving the cycle characteristics were similarly provided even by changing positive electrode active materials, but in the case where the positive electrode active materials operating at high potentials were used, the improvement effect was larger. Since the graphite of the negative electrode has a most part of the charge and discharge region at about 0.1 V to 0.2 V with respect to Li, the positive electrode potential is the sum of the cell voltage and 0.1 V to 0.2 V. For example, in a battery using the graphite, in the case where the battery is charged up to 4.75 V, the positive electrode potential is about 4.85 V with respect to Li. From the results in Table 7, even about 4.3 V of the positive electrode potential gave the effect, but the cases of 4.5 V or higher thereof gave a larger effect.

Evaluation of Negative Electrode Active Materials

Examples 41 to 43, and Comparative Examples 30 to 32

Batteries were fabricated in the same manner as in Example 1, except for using materials shown in Table 8 as negative electrode active materials, and altering solvent compositions of nonaqueous electrolytes to compositions shown in Table 8, and the cycle characteristics were evaluated. The charge and discharge range was made to be a range shown in Table 8 as a charge and discharge voltage range such that the negative electrode active materials could be provided with a sufficient capacity and life characteristics, and capacity maintenance rates at 45° C. after 200 cycles were evaluated in the same manner as in Example 1. The results are shown in Table 8.

TABLE 8

Results of Evaluation by Changing Negative Electrode Active materials

|  | Negative Electrode Active materials | Electrolyte Solvent Composition (volume ratio) | Charge and Discharge Range | Capacity Maintenance Rate at 45° C. after 200 Cycles |
|---|---|---|---|---|
| Comparative Example 30 | $SiO_x$ + carbon | EC/FP1/FE01 = 2/3/5 | 4.75 V-3 V | 65% |
| Example 41 | $SiO_x$ + carbon | EC/FP1/FE01/FE10 = 2/3/4/1 | 4.75 V-3 V | 71% |
| Comparative Example 31 | hard carbon | EC/FP1/FE02 = 2/3/5 | 4.8 V-3 V | 81% |
| Example 42 | hard carbon | EC/FP1/FE02/FE11 = 2/3/4/1 | 4.8 V-3 V | 86% |
| Comparative Example 32 | $Li_4Ti_5O_{12}$ | EC/FP1/FE05 = 2/3/5 | 3.5 V-1.5 V | 85% |

TABLE 8-continued

Results of Evaluation by Changing Negative Electrode Active materials

| | Negative Electrode Active materials | Electrolyte Solvent Composition (volume ratio) | Charge and Discharge Range | Capacity Maintenance Rate at 45° C. after 200 Cycles |
|---|---|---|---|---|
| Example 43 | Li$_4$Ti$_5$O$_{12}$ | EC/FP1/FE05/FE09 = 2/3/4/1 | 3.5 V-1.5 V | 88% |

As shown in Table 8, the incorporation of two or more fluorine-containing ether compounds even with the negative electrode active materials being changed gave the life improvement effect.

As described above, making the constitutions according to the present embodiment gives the life improvement effect. The effect is large particularly in the case of using positive electrode active materials operating at potentials of 4.5 V or higher with respect to lithium. Thereby, there is enabled to be provided a lithium secondary battery having a high operating voltage and a long life.

EXPLANATION OF SYMBOLS

1 POSITIVE ELECTRODE ACTIVE MATERIAL LAYER
2 NEGATIVE ELECTRODE ACTIVE MATERIAL LAYER
3 POSITIVE ELECTRODE CURRENT COLLECTOR
4 NEGATIVE ELECTRODE CURRENT COLLECTOR
5 SEPARATOR
6 LAMINATE OUTER PACKAGE
7 LAMINATE OUTER PACKAGE
8 NEGATIVE ELECTRODE TAB
9 POSITIVE ELECTRODE TAB

The invention claimed is:

1. A secondary battery electrolyte, comprising:
a first fluorine-containing ether compound represented by formula (1);
a second fluorine-containing ether compound represented by formula (1); and
at least one fluorine-containing phosphate ester compound represented by formula (2)
wherein a fluorine substitution rate of the first fluorine-containing ether compound is lower than a fluorine substitution rate of the second fluorine-containing ether compound;
the fluorine substitution rate of the second fluorine-containing ether compound is higher than 80% and 95% or lower;
a content of the first fluorine-containing ether compound is higher than a content of the second fluorine-containing ether compound;
the content of the first fluorine-containing ether compound is 0.1 vol % or higher and 80 vol % or lower of the electrolyte; and
the content of the second fluorine-containing ether compound is 0.1 vol % or higher and 40 vol % or lower of the electrolyte, where $$R_1\text{—O—}R_2 \tag{1}$$

wherein $R_1$ and $R_2$ are each independently alkyl group or fluorine-containing alkyl group, and at least one of $R_1$ and $R_2$ is fluorine-containing alkyl group; and $$O=P(\text{—O—}R_1')(\text{—O—}R_2')(\text{—O—}R_3') \tag{2}$$

wherein $R_1'$, $R_2'$ and $R_3'$ are each independently alkyl group or fluorine-containing alkyl group, and at least one of $R_1'$, $R_2'$ and $R_3'$ is fluorine-containing alkyl group.

2. The secondary battery electrolyte according to claim 1, wherein sum totals of the numbers of carbon atoms of the fluorine-containing ether compounds represented by formula (1) are each 4 or more and 10 or less.

3. The secondary battery electrolyte according to claim 1, wherein the first fluorine-containing ether compound has a fluorine substitution rate of 40% or higher and 80% or lower.

4. The secondary battery electrolyte according to claim 1, wherein the fluorine-containing phosphate ester compound is at least one selected from tris(2,2,2-trifluoroethyl) phosphate, tris(2,2,3,3,3 pentafluoropropyl) phosphate and tris (1H,1H-heptafluorobutyl) phosphate.

5. The secondary battery electrolyte according to claim 1, further comprising a cyclic carbonate in a range of 1 vol % or more and 50 vol % or less of the electrolyte.

6. The secondary battery electrolyte according to claim 1, comprising a sulfone compound represented by formula (3):

$$R_1''\text{—SO}_2\text{—}R_2'' \tag{3}$$

wherein $R_1''$ and $R_2''$ are each independently substituted or unsubstituted alkyl group, and this compound may be a cyclic compound in which carbon atoms of $R_1''$ and $R_2''$ are bonded through a single bond or a double bond.

7. The secondary battery electrolyte according to claim 6, wherein the total of contents of the fluorine-containing phosphate ester compound and the sulfone compound is 0.1 vol % or higher and 70 vol % or lower of the electrolyte.

8. The secondary battery electrolyte according to claim 6, wherein the sulfone compound is at least one selected from sulfolane, dimethyl sulfone, ethyl methyl sulfone and diethyl sulfone.

9. A secondary battery comprising a positive electrode, a negative electrode, and an electrolyte comprising a supporting salt and a nonaqueous electrolytic solvent, wherein the electrolyte is a secondary battery electrolyte according to claim 1.

10. The secondary battery according to claim 9, wherein the positive electrode comprises a positive electrode active material intercalating and deintercalating Li at a potential of 4.5 V or higher with respect to lithium.

11. The secondary battery according to claim 10, wherein the positive electrode active material comprises one or more lithium metal complex oxides represented by any of the following formulae (4), (5), (6) and (7):

$$\text{Li}_a(\text{M}_x\text{Mn}_{2-x-y}\text{Y}_y)(\text{O}_{4-w}\text{Z}_w) \tag{4}$$

wherein $0.4 \leq x \leq 1.2$, $0 \leq y$, $x+y<2$, $0 \leq a \leq 1.2$, and $0 \leq w \leq 1$; M is a transition metal element, and includes at least one selected from the group consisting of Co, Ni, Fe, Cr and Cu; Y is a metal element, and includes at least one selected from the group consisting of Li, B, Na, Al, Mg, Ti, Si, K and Ca; and Z is a halogen element, and includes at least one selected from the group consisting of F and Cl;

$$LiMPO_4 \tag{5}$$

wherein M is a transition metal element, and includes at least one selected from Co and Ni;

$$Li(M_{1-z}Mn_z)O_2 \tag{6}$$

wherein $0.33 \geq z \geq 0.7$; and M is a metal element, and includes at least one selected from Li, Co and Ni; and $$Li(Li_xM_{1-x-z}Mn_z)O_2 \tag{7}$$

wherein $0.1 \leq x < 0.3$, $0.33 \geq z \geq 0.7$; and M is a metal element, and includes at least one selected from Co and Ni.

12. A method for manufacturing a secondary battery electrolyte, comprising a step of mixing, in an electrolyte,
a first fluorine-containing ether compound represented by formula (1);
a second fluorine-containing ether compound represented by formula (1); and
at least one selected from fluorine-containing phosphate ester compounds represented by formula (2)
wherein a fluorine substitution rate of the first fluorine-containing ether compound is lower than a fluorine substitution rate of the second fluorine-containing ether compound;
the fluorine substitution rate of the second fluorine-containing ether compound is higher than 80% and 95% or lower;
a content of the first fluorine-containing ether compound is higher than a content of the second fluorine-containing ether compound;
the content of the first fluorine-containing ether compound is 0.1 vol % or higher and 80 vol % or lower of the electrolyte; and
the content of the second fluorine-containing ether compound is 0.1 vol % or higher and 40 vol % or lower of the electrolyte.

13. The method for manufacturing a secondary battery electrolyte according to claim 12, wherein the at least one fluorine-containing phosphate ester compounds comprises a sulfone compounds represented by a formula (3), $$R_1''—SO_2—R_2'' \tag{3}$$

wherein $R_1''$ and $R_2''$ are each independently substituted or unsubstituted alkyl group, and this compound may be a cyclic compound in which carbon atoms of $R_1''$ and $R_2''$ are bonded through a single bond or a double bond.

14. The method for manufacturing a secondary battery electrolyte according to claim 13, wherein the total of contents of the fluorine-containing phosphate ester compound and the sulfone compound is 0.1 vol % or higher and 70 vol % or lower of the electrolyte.

15. The method for manufacturing a secondary battery electrolyte according to claim 13, wherein the sulfone compound is at least one selected from sulfolane, dimethyl sulfone, ethyl methyl sulfone and diethyl sulfone.

16. A method for manufacturing a secondary battery having a positive electrode, a negative electrode, an electrolyte and an outer package,
the method comprising a step of arranging the positive electrode and the negative electrode facing to each other, and sealing the arrangement together with the electrolyte in the outer package,
wherein the electrolyte is a secondary battery electrolyte manufactured by a manufacture method according to claim 12.

* * * * *